US012602387B1

(12) United States Patent
Summa et al.

(10) Patent No.: US 12,602,387 B1
(45) Date of Patent: Apr. 14, 2026

(54) SYSTEMS AND METHODS FOR SITUATIONALLY AWARE OUTPUT FROM A MULTI-MODAL ARTIFICIAL INTELLIGENCE AGENT

(71) Applicant: Dell Products L.P., Round Rock, TX (US)

(72) Inventors: Erik Summa, Lockhart, TX (US); Jason S. Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/986,486

(22) Filed: Dec. 18, 2024

(51) Int. Cl.
*G06F 16/2457* (2019.01)

(52) U.S. Cl.
CPC .............................. *G06F 16/24575* (2019.01)

(58) Field of Classification Search
CPC ................................................. G06F 16/24575
See application file for complete search history.

(56) References Cited

U.S. PATENT DOCUMENTS

| | | | | |
|---|---|---|---|---|
| 7,363,345 | B2 * | 4/2008 | Austin-Lane | ......... H04L 67/535 709/224 |
| 8,188,936 | B2 * | 5/2012 | Fuller | ..................... G06F 9/542 345/2.1 |
| 9,361,387 | B2 * | 6/2016 | Dumais | ............... G06F 16/9537 |
| 9,367,806 | B1 * | 6/2016 | Cosic | ........................ G06N 5/02 |
| 9,733,880 | B2 * | 8/2017 | Levesque | .................. G06T 7/70 |
| 11,164,577 | B2 * | 11/2021 | Vashisht | ............... G06F 3/167 |
| 11,435,829 | B2 * | 9/2022 | Feehan | ..................... G08B 6/00 |
| 11,645,871 | B1 * | 5/2023 | Rakshit | ................ G06F 1/1626 345/156 |
| 11,886,628 | B2 * | 1/2024 | Nattinger | ................ G06F 3/011 |
| 2009/0177644 | A1 * | 7/2009 | Martinez | ........... G06Q 30/0201 707/999.005 |
| 2011/0107379 | A1 * | 5/2011 | Lajoie | ................... H04L 65/611 725/151 |
| 2015/0142824 | A1 * | 5/2015 | Tipton | .................. H04W 4/029 707/769 |
| 2019/0138930 | A1 * | 5/2019 | Margiolas | .......... G06Q 30/0251 |
| 2019/0171187 | A1 * | 6/2019 | Cella | ...................... G06N 3/126 |
| 2023/0124288 | A1 * | 4/2023 | Meier-Hellstern | ... G06N 3/0455 706/12 |
| 2025/0182163 | A1 * | 6/2025 | Publicover | ........... H04L 67/306 |
| 2025/0190713 | A1 * | 6/2025 | Abhyanker | ............. H04W 4/02 |

* cited by examiner

*Primary Examiner* — Jorge A Casanova
(74) *Attorney, Agent, or Firm* — Jackson Walker L.L.P.

(57) ABSTRACT

An information handling system may include a memory and a processor communicatively coupled to the memory, and configured to, in response to a determination of a need to communicate content to a user, identify a nature of the content, determine a context associated with the user, determine device information regarding one or more user devices of the user, and based on the nature, the context, and the device information determine a mode for communicating the content to the user and communicate the content to the user in accordance with the mode.

15 Claims, 2 Drawing Sheets

200

START

202 — ARTIFICIAL INTELLIGENCE AGENT 108 DETERMINES NEED TO COMMUNICATE WITH USER

204 — SITUATIONAL MODEL OF ARTIFICIAL INTELLIGENCE AGENT 108 IDENTIFIES CONTENT ASSOCIATED WITH DESIRED COMMUNICATION TO USER

206 — SITUATIONAL MODEL DETERMINES CONTEXT ASSOCIATED WITH USER

208 — SITUATIONAL MODEL OF ARTIFICIAL INTELLIGENCE AGENT 108 RECEIVES INFORMATION REGARDING USER DEVICES 102 AVAILABLE FOR INTERACTION

210 — BASED ON IDENTIFIED CONTENT, USER CONTEXT, AND DEVICE INFORMATION, SITUATIONAL MODEL DETERMINES MODE TO FULFILL THE DESIRED INTERACTION

END

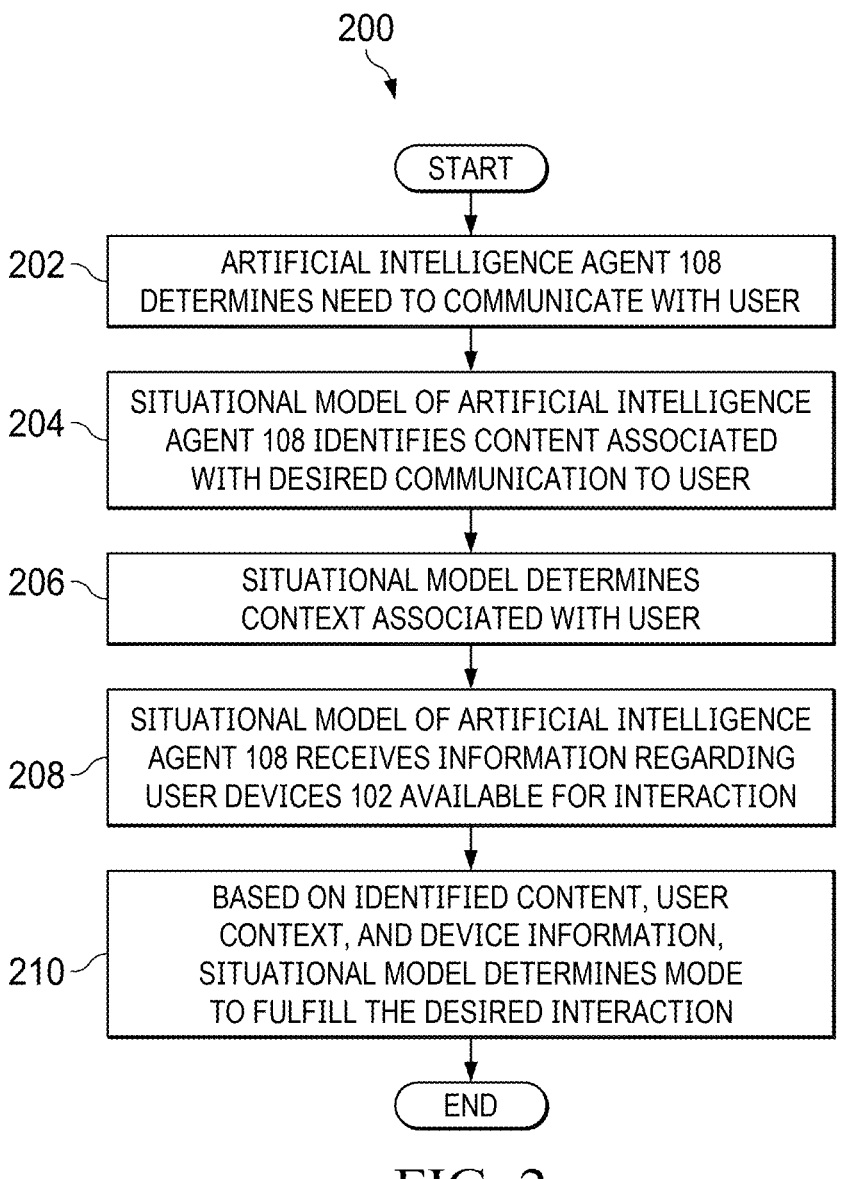

200

START

202 — ARTIFICIAL INTELLIGENCE AGENT 108
DETERMINES NEED TO COMMUNICATE WITH USER

204 — SITUATIONAL MODEL OF ARTIFICIAL INTELLIGENCE
AGENT 108 IDENTIFIES CONTENT ASSOCIATED
WITH DESIRED COMMUNICATION TO USER

206 — SITUATIONAL MODEL DETERMINES
CONTEXT ASSOCIATED WITH USER

208 — SITUATIONAL MODEL OF ARTIFICIAL INTELLIGENCE
AGENT 108 RECEIVES INFORMATION REGARDING
USER DEVICES 102 AVAILABLE FOR INTERACTION

210 — BASED ON IDENTIFIED CONTENT, USER
CONTEXT, AND DEVICE INFORMATION,
SITUATIONAL MODEL DETERMINES MODE
TO FULFILL THE DESIRED INTERACTION

END

FIG. 2

SYSTEMS AND METHODS FOR SITUATIONALLY AWARE OUTPUT FROM A MULTI-MODAL ARTIFICIAL INTELLIGENCE AGENT

TECHNICAL FIELD

The present disclosure relates in general to information handling systems, and more particularly to methods and systems for providing situationally aware output from a multi-modal artificial intelligence agent.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly used for artificial intelligence. Artificial intelligence, in its broadest sense, is intelligence exhibited by machines, particularly information handling systems. Artificial intelligence is a field of research in computer science that develops and studies methods and software that enable machines to perceive their environment and use learning and intelligence to take actions that maximize their chances of achieving defined goals.

Personal artificial intelligence agents are becoming increasingly ubiquitous. Broadly speaking, a personal artificial intelligence agent, which may also be known as an artificial intelligence-powered personal assistant, is a virtual software agent designed to assist a user with various tasks and provide information using artificial intelligence technologies. In some instances, an artificial intelligence agent may be a "multi-modal" agent, in which the artificial intelligence agent and the user may be capable of interacting with each other via a text-based chat, a voice-based chat, and/or via gestures, and/or in which the artificial intelligence agent and the user may be capable of interacting with each other via different devices of the user (e.g., a smart phone, a notebook computer, a smart watch, etc.).

With this flexibility and agility, it may be desirable for an artificial intelligence agent to be tactful in the way it engages with the user. For example, a user would likely not desire to have a voice-based interaction with an artificial intelligence agent while viewing a movie or show in a theater. As another example, it may not be desirable for an artificial intelligence agent to discuss a visual asset (e.g., a photo or video) verbally during a telephone call. As a further example, it may not be desirable for an artificial intelligence agent to request an interaction via a very immersive device when the user would prefer not to be distracted with the interaction (e.g., during sleep or when on a nature hike). As yet another example, a user would likely not desire to have a voice-based interaction with an artificial intelligence agent while riding in a crowded elevator.

SUMMARY

In accordance with the teachings of the present disclosure, the disadvantages and problems associated with existing approaches to engagement between an artificial intelligence agent and a user may be reduced or eliminated.

In accordance with embodiments of the present disclosure, an information handling system may include a memory and a processor communicatively coupled to the memory, and configured to, in response to a determination of a need to communicate content to a user, identify a nature of the content, determine a context associated with the user, determine device information regarding one or more user devices of the user, and based on the nature, the context, and the device information determine a mode for communicating the content to the user and communicate the content to the user in accordance with the mode.

In accordance with these and other embodiments of the present disclosure, a method may include, in response to a determination of a need to communicate content to a user, identifying a nature of the content, determining a context associated with the user, determining device information regarding one or more user devices of the user, and based on the nature, the context, and the device information determining a mode for communicating the content to the user and communicating the content to the user in accordance with the mode.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in response to a determination of a need to communicate content to a user, identify a nature of the content, determine a context associated with the user, determine device information regarding one or more user devices of the user, and based on the nature, the context, and the device information determine a mode for communicating the content to the user and communicate the content to the user in accordance with the mode.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a flow chart of an example method for situationally aware output by a multi-modal artificial intelligence agent, in accordance with embodiments of the present disclosure.

DETAILED DESCRIPTION

Figure 1:
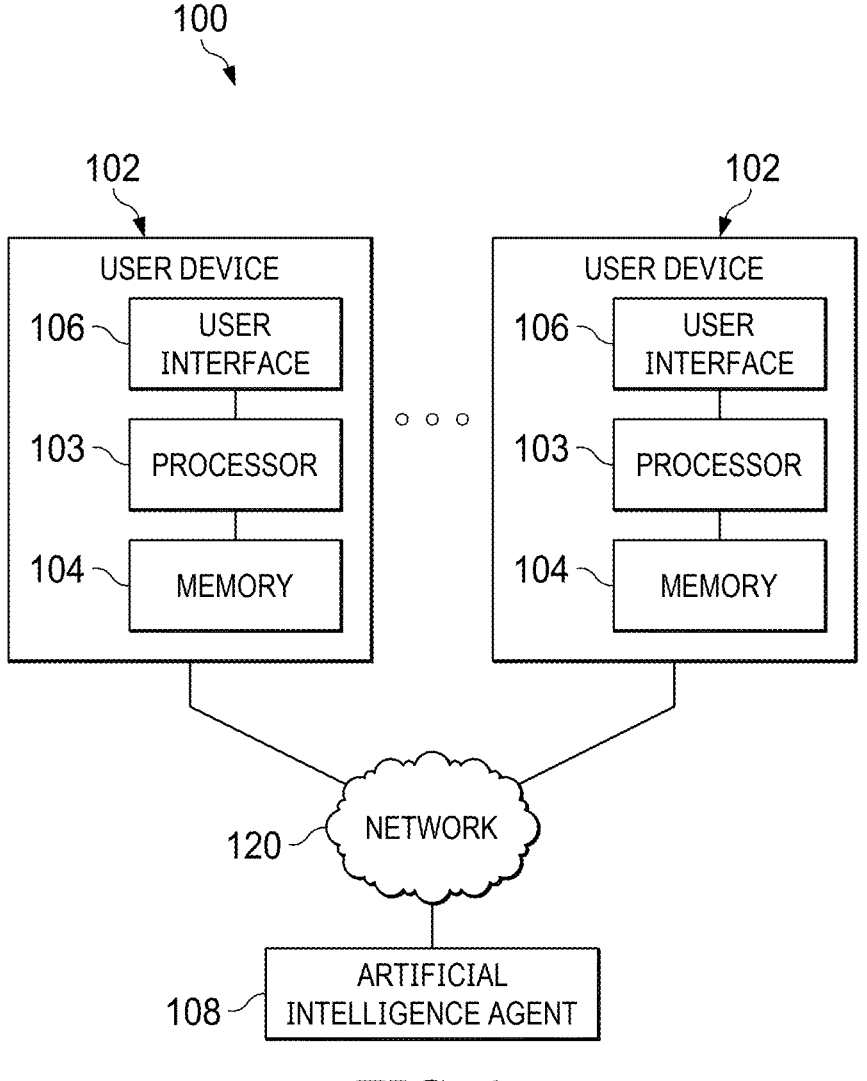
FIG. 1 illustrates a block diagram of an example user environment of devices, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example user environment 100 of user devices 102, in accordance with embodiments of the present disclosure. As shown in FIG. 1, user environment 100 may include a plurality of user devices 102, an artificial intelligence agent 108, and a network 120.

Each user device 102 may comprise an information handling system, as defined above. The various user devices 102 in user environment 100 may represent different types of information handling systems used by a user. For example, one user device 102 may comprise a smart phone, another user device 102 may comprise a tablet, and yet another user device may comprise a personal computer, such as a laptop or notebook computer.

As depicted in FIG. 1, each user device 102 may include a processor 103, a memory 104 communicatively coupled to processor 103, and a user interface 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), graphics processing unit (GPU), neural processing unit (NPU), or any other digital or analog circuitry configured to interpret and/or execute program instructions and/or process data. In some embodiments, processor 103 may interpret and/or execute program instructions and/or process data stored in memory 104 and/or another component of a user device 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to user device 102 is turned off.

User interface 106 may comprise any instrumentality or aggregation of instrumentalities by which a user may interact with a user device 102. For example, user interface 106 may permit a user to input data and/or instructions into user device 102 (e.g., via a keyboard, pointing device, touchscreen, camera) and/or otherwise manipulate information handling system 102 and its associated components. User interface 106 may also permit information handling system 102 to communicate data to a user, e.g., by way of a display device (e.g., a liquid crystal display), via audible sound (e.g., a speaker or headphone), and/or haptic feedback (e.g., via vibration).

For purposes of clarity and exposition, each user device 102 is depicted as only including a processor 103, a memory 104, and a user interface 106. However, each user device 102 may comprise other information handling resources not explicitly depicted in FIG. 1.

Artificial intelligence agent 108 may comprise any system, device, or apparatus configured to provide a virtual software agent designed to assist a user with various tasks and provide information using artificial intelligence technologies. In some instances, artificial intelligence agent 108 may comprise a "multi-modal" agent, in which artificial intelligence agent 108 and a user of user environment 100 may be capable of interacting with each other via a text-based chat, a voice-based chat, and/or via gestures, and/or in which artificial intelligence agent 108 and the user may be capable of interacting with each other via different user devices 102 of the user. In some embodiments, artificial intelligence agent 108 may comprise an information handling system distinct from user devices 102 (e.g., may execute on an information handling system "in the cloud" and be communicatively coupled to user devices 102 via network 120). In other embodiments, artificial intelligence agent 108 may comprise executable instructions stored within a memory 104 or one of user devices 102, with such instructions configured to be read and executable by processor 103 of such user device 102 in order to carry out the functionality of artificial intelligence agent 108.

Network 120 may comprise a network and/or fabric configured to communicatively couple user devices 102 and artificial intelligence agent 108 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In operation, artificial intelligence agent 108 may be configured to, in addition to functionality discussed above, determine a user context of a user of user environment 100, and based on such context, hardware capabilities of user devices 102, and the nature of content to be communicated between artificial intelligence agent 108 and the user, determine a mode of interaction between artificial intelligence agent 108 and the user (e.g., wherein such mode may be the least invasive form of interaction based on context, hardware capabilities, and/or quality of the interaction).

The user context, as used herein, may refer to any characteristic associated with a user, and may include without limitation the user's sentiment, the user's location, the time (e.g., hour of day, day of week, etc.), the user's calendar, biological signals of the user (e.g., heart rate), user presence (e.g., whether user is looking at device, touching the device, etc.), user preferences, and/or any other characteristic or parameter associated with or attributable to a user that may affect a desirability of interacting via a particular mode with artificial intelligence agent 108.

Further, as used herein, a mode of interaction may include any manner or combination of manners in which artificial intelligence agent 108 and a user may interact. For example, a mode may include a type of interaction (e.g., text, voice, gesture, etc.) and/or a user device 102 used for such interaction.

FIG. 2 illustrates a flow chart of an example method 200 for situationally aware output by a multi-modal artificial intelligence agent, in accordance with embodiments of the present disclosure. According to some embodiments, method 200 may begin at step 202. As noted above, teachings of the present disclosure may be implemented in a variety of configurations of user environment 100. As such, the preferred initialization point for method 200 and the order of the steps comprising method 200 may depend on the implementation chosen.

At step 202, artificial intelligence agent 108 may determine a need to communicate with a user. At step 204, a situational model of artificial intelligence agent 108 may identify the nature of content associated with the desired communication to the user. For example, identifying the nature of the content may include whether the communication with the user is display of a picture, display of a video, display of textual information, playback of audio, prompting a user for information, etc.

At step 206, the situational model of artificial intelligence agent 108 may determine a context associated with the user. At step 208, the situational model of artificial intelligence agent 108 may receive information regarding what user devices 102 are available for interaction, wherein such information may include hardware capabilities (e.g., available user interfaces) of and/or physical locations of user devices 102 (e.g., proximity of user devices 102 to the user).

At step 210, based on the identified content, user context, and device information, the situational model of artificial intelligence agent 108 may determine (e.g., via artificial intelligence inference) a mode to fulfill the desired interaction. In some embodiments, the situational model may use chain of thought reasoning to prompt itself regarding what information it needs to make the determination. In such embodiments, the model may use various application programming interfaces to find the answers to such self-prompts. After completion of step 210, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using a variety of configurations of user environment 100 and/or any other system operable to implement method 200. In certain embodiments, method 200 may be implemented partially or fully in software and/or firmware embodied in computer-readable media.

A few example, non-exhaustive use cases may illustrate the methods and systems described above. In a first scenario, a single user may have a single device with different manners of outputting information from artificial intelligence agent 108 to the user. An example of such scenario may be a user is viewing a movie in a movie theater and the user has a smart phone on their person. Artificial intelligence agent 108 may have updates to a generative text project for which it is working on. In such case, the situational model of artificial intelligence agent 108 may determine a text message is the best mode of interaction, so as to not communicate audio information in a theater and the situational model may also know that the update is not of sufficient importance to generate a haptic vibration of the smart phone.

In a second scenario, a single user may have two devices with which artificial intelligence agent 108 may interact with the user. An example of such scenario would be a user located in a room of the user's house, with a smart phone in the user's pocket and a smart screen device (e.g., virtual assistant) placed on a surface in the room, and no other persons present in the room. Artificial intelligence agent 108 may have a visual update to present to the user. In such case, the situational model of artificial intelligence agent 108 may determine that display of the visual update to the smart screen device may be the best mode of interaction, as the user may not like to remove his/her smart phone from his/her pocket.

In a third scenario, two users may each have a personal device and a single shared device. An example of such a scenario would be the two users in a conference room discussing a project. Each user may have their own laptop computer and the room may include a projector with cloud connectivity. The users are not active on any of the devices, have finished speaking about the project and are discussing non-work related issues. In such situation, the situational model for one of the users may want to notify the user that the user has another meeting about to start, and the model may notice that the other user in the room is also on the invitation list for the other meeting. Accordingly, the situational model may use the projector to display a meeting reminder alert to both users and/or may play an audio alert to the room's audio system to interrupt the conversation and/or alert the users to their next meeting.

In a fourth scenario, four users may each have one or more personal devices and a single shared device. An example of such scenario would be three co-workers from one company and another person from another company in a conference room discussing a project. Each user may have their own laptop computer and the room may include a projector with cloud connectivity. A first user is presenting to the group and artificial intelligence agent 108 has just finished generating audio content for the first user. The content is applicable to the subject of the meeting, but the external employee is not privileged to the content. The situational model may decide to notify the first user that it has important information to share, but it should not immediately share due to the presence of the external employee. The situational model may also send a text alert to the first user indicating that it has important audio to share but that the audio should only be consumed when the external employee is not present in the room.

In a fifth scenario, a single user may have four personal devices: a smart phone, spatial headphones, mixed reality glasses, and a conventional laptop computer. Artificial intelligence agent 108 may desire the user review spatial content that it has generated in response to the user's request. Because the content is spatial, the situational model may suggest the user use the mixed reality glasses to review the content, and the situational model may not even consider use of the other devices the user has (even though available) as the other devices may not be capable of seeing the three-dimensional spatial content in an immersive environment. On the other hand, if the user was not currently using the mixed reality glasses but was instead using his/her smart phone or laptop, the situational model may opt to send a message or speak a message to the user prompting the user to wear the mixed reality glasses in order to view the content.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, configured, enabled, capable, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a memory; and
a processor communicatively coupled to the memory, and configured to, in response to a determination of a need to communicate content to a user:
identify a nature of the content, wherein the nature of the content indicates whether the content is visual, audio, and/or haptic content;
determine a context associated with the user;
determine device information regarding one or more user devices of the user; and
based on the nature, the context, and the device information:

determine a mode for communicating the content to the user; and communicate the content to the user in accordance with the mode.

2. The information handling system of claim 1, wherein the context comprises at least one of: a sentiment of the user, a location of the user, a time, contents of a calendar of the user, a biological signal associated with the user, a user presence with respect to the one or more user devices, and a user preference.

3. The information handling system of claim 1, wherein the device information comprises at least one of a physical location of one or more devices and hardware capability information associated with the one or more devices.

4. The information handling system of claim 1, wherein the mode includes an identification of a device of the one or more devices.

5. The information handling system of claim 1, wherein the mode includes an identification of a type of interaction with the user for communicating the content.

6. A method comprising, in response to a determination of a need to communicate content to a user:

identifying a nature of the content, wherein the nature of the content indicates whether the content is visual, audio, and/or haptic content;

determining a context associated with the user;

determining device information regarding one or more user devices of the user; and based on the nature, the context, and the device information:

determining a mode for communicating the content to the user; and communicating the content to the user in accordance with the mode.

7. The method of claim 6, wherein the context comprises at least one of: a sentiment of the user, a location of the user, a time, contents of a calendar of the user, a biological signal associated with the user, a user presence with respect to the one or more user devices, and a user preference.

8. The method of claim 6, wherein the device information comprises at least one of a physical location of one or more devices and hardware capability information associated with the one or more devices.

9. The method of claim 6, wherein the mode includes an identification of a device of the one or more devices.

10. The method of claim 6, wherein the mode includes an identification of a type of interaction with the user for communicating the content.

11. An article of manufacture comprising:

a non-transitory computer-readable medium; and computer-executable instructions carried on the computer-readable medium, the instructions readable by a processor, the instructions, when read and executed, for causing the processor to, in response to a determination of a need to communicate content to a user:

identify a nature of the content, wherein the nature of the content indicates whether the content is visual, audio, and/or haptic content;

determine a context associated with the user;

determine device information regarding one or more user devices of the user; and based on the nature, the context, and the device information:

determine a mode for communicating the content to the user; and communicate the content to the user in accordance with the mode.

12. The article of claim 11, wherein the context comprises at least one of: a sentiment of the user, a location of the user, a time, contents of a calendar of the user, a biological signal associated with the user, a user presence with respect to the one or more user devices, and a user preference.

13. The article of claim 11, wherein the device information comprises at least one of a physical location of one or more devices and hardware capability information associated with the one or more devices.

14. The article of claim 11, wherein the mode includes an identification of a device of the one or more devices.

15. The article of claim 11, wherein the mode includes an identification of a type of interaction with the user for communicating the content.

\* \* \* \* \*